US007453490B2

(12) United States Patent
Gunday

(10) Patent No.: US 7,453,490 B2
(45) Date of Patent: Nov. 18, 2008

(54) CORRECTION OF IMAGE SIGNALS CHARACTERISTIC OF NON-UNIFORM IMAGES IN AN ENDOSCOPIC IMAGING SYSTEM

(75) Inventor: Erhan Gunday, San Francisco, CA (US)

(73) Assignee: Gyrus ACMI, Inc., Southborough, MA (US)

( * ) Notice: Subject to any disclaimer, the term of this patent is extended or adjusted under 35 U.S.C. 154(b) by 667 days.

(21) Appl. No.: 10/339,145

(22) Filed: Jan. 8, 2003

(65) Prior Publication Data

US 2003/0142753 A1 Jul. 31, 2003

Related U.S. Application Data

(60) Continuation-in-part of application No. 09/384,926, filed on Aug. 26, 1999, which is a continuation-in-part of application No. 09/228,773, filed on Jan. 11, 1999, now Pat. No. 6,100,920, which is a division of application No. 08/791,637, filed on Jan. 31, 1997, now abandoned.

(51) Int. Cl.
*H04N 7/18* (2006.01)

(52) U.S. Cl. ........................................................ 348/68

(58) Field of Classification Search .................. 348/61, 348/65, 70, 71, 68; 600/160; *H04N 7/18*
See application file for complete search history.

(56) References Cited

U.S. PATENT DOCUMENTS

| 3,654,385 | A | | 4/1972 | Flagle |
| 4,803,550 | A | | 2/1989 | Yabe et al. |
| 4,979,042 | A | | 12/1990 | Vogel |
| 5,022,383 | A | | 6/1991 | Sakiyama et al. |
| 5,047,847 | A | | 9/1991 | Toda et al. |
| 5,157,497 | A | | 10/1992 | Topper et al. |
| 5,269,289 | A | | 12/1993 | Takehana et al. |
| 5,343,302 | A | | 8/1994 | Yamahita |
| 5,589,874 | A | * | 12/1996 | Buchin ........................ 348/65 |
| 5,627,583 | A | | 5/1997 | Nakamura et al. |
| 5,631,695 | A | | 5/1997 | Nakamura et al. |
| 6,100,920 | A | | 8/2000 | Miller et al. |
| 6,537,211 | B1 | * | 3/2003 | Wang et al. .................. 600/160 |

* cited by examiner

*Primary Examiner*—Young Lee
(74) *Attorney, Agent, or Firm*—Ganz Law, P.C.

(57) ABSTRACT

The subject matter hereof relates to systems and methods of providing for correction of image signals characteristic of non-uniform images. Various example embodiments of systems and methods so providing correction include embodiments directed to endoscopic imaging systems, endoscopes, and endoscopic imaging methods. Various example embodiments of systems and methods so providing correction include embodiments: that establish one or more correction factors and correct selected image data using at least one of such correction factors; and/or that establish one or more correction factors in performing a trigger operation, e.g., a white balance operation.

49 Claims, 6 Drawing Sheets

CORRECTION OF IMAGE SIGNALS CHARACTERISTIC OF NON-UNIFORM IMAGES IN AN ENDOSCOPIC IMAGING SYSTEM

This application is a continuation-in-part of pending application Ser. No. 09/384,926, filed Aug. 26, 1999, which is a continuation-in-part of application Ser. No. 09/228,773, filed Jan. 11, 1999, issued on Aug. 8, 2000 as U.S. Pat. No. 6,100,920, which is a division of application Ser. No. 08/791,637, filed Jan. 31, 1997, now abandoned, the disclosure of which applications and patent are hereby incorporated by reference in their entireties for all purposes.

BACKGROUND

The systems, methods and apparatus of the present invention relate generally to image signal processing, and more particularly to systems, methods and apparatus for correcting image signals characteristic of non-uniform illumination and/or non-uniform optical characteristics in an endoscopic imaging system.

Advances in video, digital signal processing, and fiber optic technologies have facilitated the creation of many new products. The combination of these and other technologies has enabled the development of various important advances in medical instrumentation. Advances in one category of medical instrumentation in particular, that is, endoscopic imaging systems, have resulted in great benefits to patients in terms of diagnostic and treatment procedures.

Even with these advances and benefits, endoscopic imaging systems are amenable to further improvement.

In that regard, it has been recognized here that systems, methods and apparatus are needed for correcting image signals in endoscopic imaging systems where such signals are characteristic of non-uniform illumination or image formation.

SUMMARY

The present invention satisfies the aforementioned needs. Systems, methods and apparatus in accordance with the present invention provide for correction of image signals characteristic of non-uniform illumination in endoscopic imaging systems. In so doing, systems, methods and apparatus provide enhanced display of a display image for a user (e.g., a surgeon, patient, surgical team, students or otherwise). Such enhancement preferably is characterized by improved uniformity in illumination across the display image or by correction of optical characteristics.

In one novel embodiment, the present invention provides an endoscopic imaging system comprising system components constructed and arranged to perform a characterization operation; establish, based at least in part on the characterization operation, one or more correction factors; acquire image data associated with the target site; and apply, using at least one of the established correction factors, a correction operation as to selected image data.

In another novel embodiment, the present invention provides an endoscope comprising elements that are constructed and arranged to perform a characterization operation; establish, based at least in part on the characterization operation, one or more correction factors; acquire image data associated with the target site; and apply, using at least one of the established correction factors, a correction operation as to selected image data.

In yet another novel embodiment, the present invention provides an imaging system comprising means for performing a characterization operation; means for establishing, based at least in part on the characterization operation, one or more correction factors; means for acquiring image data associated with the target site; and means for applying, using at least one of the established correction factors, a correction operation as to selected image data.

In still another novel embodiment, the present invention provides a method of correcting, in a digital domain, an image signal characteristic of non-uniform illumination and/or non-uniform optical characteristics in an endoscopic imaging system, the image signal representing an image associated with a target site, comprising performing a characterization operation; establishing, based at least in part on the characterization operation, one or more correction factors; acquiring image data associated with the target site; and applying, using at least one of the established correction factors, a correction operation as to selected image data.

The foregoing novel embodiments may include other advantageous features, defining further novel embodiments. Some such features are noted below and may be added to one or more of the foregoing embodiments alone or in combinations. In this regard, the system components or endoscope elements further perform a characterization trigger operation to trigger performing the characterization operation.

Additionally, the system components or endoscope elements apply one or more selected correction operation, such application of each selected correction operation being responsive to one or more of: portion(s) of the target site, component(s) of acquired image data, user input, system configuration, and system operation.

Furthermore, the system components or endoscope elements perform defect correction associated with one or more defective imaging elements, which defect correction comprises at least one of: (a) interpolation of image data of selected imaging elements; (b) extrapolation of image data from selected imaging elements; and (c) substitution of image data from a selected imaging element.

The foregoing is not intended to be an exhaustive list of the novel features of the present invention; these and other novel features of the present invention are described below in more detail.

DETAILED DESCRIPTION

Figure 1A:
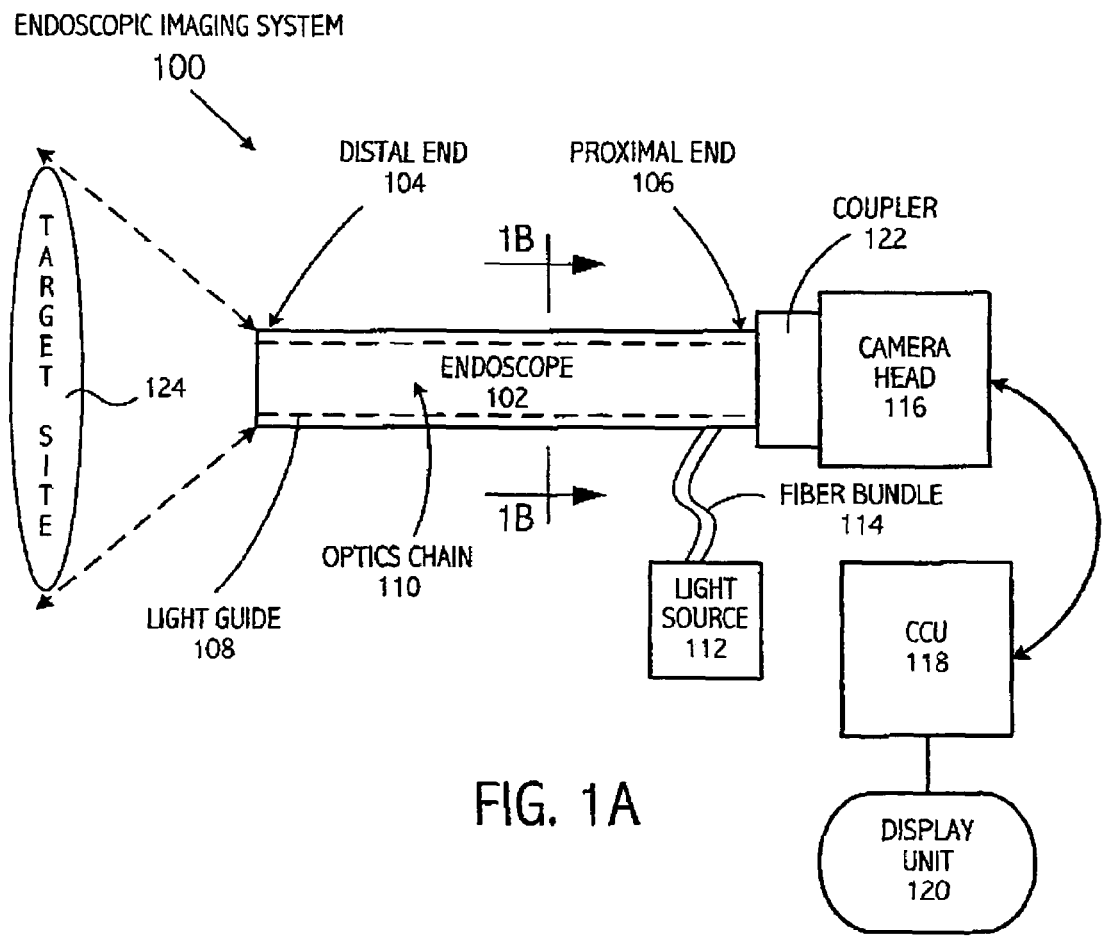
FIG. 1A is a block diagram representation of an endoscopic imaging system.
Figure 1B:
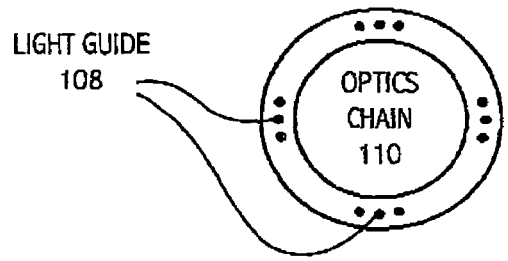
FIG. 1B is a cross-sectional view of the endoscope, taken along line B-B thereof, illustrating various components thereof.

Referring to FIG. 1A and FIG. 1B, a typical endoscopic imaging system 100 is illustrated. Such system 100 typically includes an endoscope 102, a light source 112, a fiber bundle 114, a camera head 116, and a camera control unit (CCU) 118. Endoscope 102 typically comprises a proximal end 106 and a distal end 104, an optics chain 110 disposed along a longitudinal center thereof, and a light guide 108 disposed along a longitudinal periphery (for example, an annular ring of light fibers around the optics chain). Distal end 104 of endoscope 102 is typically adapted for introduction into the body of a patient. Light source 112 may be any suitable light source, such as a xenon, metal halide, hologen, or other source of electromagnetic radiation that may be selected. (Herein, it is recognized that the term "light" covers any such electromagnetic radiation, whether or not in the visible band.)

Fiber bundle 114 delivers light from light source 112 to light guide 108 for transmission to, and radiation from, distal end 104 of endoscope 102. Fiber bundle 114 typically is flexible. The bundle's radiated light provides for illumination of a target site 124. Fiber bundle 114 and light guide 108 do not necessarily have a one-to-one relationship in the delivery of light (e.g. due to diffusion of the light).

Of the illuminated target site, the endoscope 102 provides an image (e.g., acquisition of light reflected off the site's associated surfaces). Optics chain 110 carries the image from distal end 104 to proximal end 106 of endoscope 102.

Camera head 116 typically is attached to or otherwise associated with proximal end 106 of endoscope 102. For example, a coupler mechanism 122 may be used for attaching the head 116 to the proximal end 106 of the endoscope 102.

Camera head 116 typically comprises an imaging detector. Examples of imaging detectors include, but are not limited to, a camera tube, a charge-coupled device (CCD), and a complementary metal oxide semiconductor (CMOS) image sensor. Camera tubes comprise, e.g., orthicon tubes, vidicon tubes, and the like. CCDs and CMOS image sensors typically comprise an array of photodiodes fabricated in a process compatible with the formation of integrated circuits which photodiodes convert light into electronic image data (e.g., electrical signals) based on the time integral of the incident light intensity. The imaging detector can also be implemented otherwise, provided that the device is capable of receiving an image for further use in the endoscopic imaging system.

In operation of the endoscopic imaging system to this point, the endoscope 102 acquires an image of the target site which image is carried to the imaging detector of the head 116 via optics chain 110. The image, so carried, is directed to the imaging detector, typically so as to be incident on the device's array of imaging elements.

The camera head 116 generates an image signal. The image signal typically is an electrical signal representing some or all of the image and/or information associated with some or all of the image. When the head's imaging detector is a CCD image sensor, the image signal of the imaging detector typically is an analog signal comprising image data (e.g., discrete values, typically voltages) for each imaging element; such signal typically being generated as the image data is (a) read out of the imaging detector in a serial fashion, line by line through the array and (b) digitized. When the head's imaging detector is a CMOS, the image signal of the imaging detector is typically an analog signal that is internally converted by CMOS imagers to a digital signal and provided as a digital output in which bytes of digital data represent each imaging element. Accordingly, because the imaging detector typically has an array of imaging elements organized in lines (also sometimes referred to herein as "scan lines"), the image data (i.e., discrete or digitized) of the elements is associated with the generation of, and generally is comprised in, an image signal. Moreover, both the image data and the image signals so generated from such data, via such line(s) or otherwise, tend to have characteristics of non-uniform illumination or non-uniform optical characteristics. (It is recognized that image data, as used herein, refers to the discrete and/or digitized data for individual imaging elements, as well as for groups of imaging elements, however organized, e.g. a pixel or groups of pixels, whatever the granularity.)

Driver circuitry may be coupled to the analog or digital versions of the image signal, or to both.

Although an image signal typically is electrical, it is recognized that an image signal may be electrical, optical, electro-optical or otherwise, without departing from the principles of the invention. As an example, the image signal may be a combination of an optical signal representing the image (e.g., in some encoded, compressed, encrypted and/or other conditioned form) and an electrical signal representing information about the image to enable correction of the optical signal, particularly the portion(s) of the optical signal exhibiting non-uniform characteristics associated with some or all of the image. As another example, an image signal can be entirely optical, with or without an information representation described above, which optical signal may be corrected via optical processing circuits (i.e., without conversion of the optical signal into and/or back from an electrical signal).

Camera control unit (CCU) 118 typically is disposed remotely from camera head 116. CCU 118 is connected to camera head 116 (e.g., via a video cable, an RF communications means, or otherwise) so as to receive an input image signal. Based directly on the image signal or some intermediate derivation thereof, CCU 118 generates an output image signal. Such output image signal generally reflects correction, in whole or in part, of some or all of the image signal, e.g., correction, in whole or in part, of some or all of the image signal characteristic of non-uniform illumination or non-uniform optical characteristics. Such output image signal typically is in a video format. However, it is recognized that the output image signal may be electrical, optical, electro-optical or otherwise, without departing from the principles of the invention.

Herein, the term "image signal" is employed to describe generally image signals of an endoscopic imaging system, regardless of the format and regardless of where the signals arise or apply. Accordingly, the term sometimes describes the entire signal representing an image including the portions thereof characteristic of non-uniform illumination and non-uniform optical characteristics and sometimes describes only the portions thereof characteristic of non-uniform illumination and non-uniform optical characteristics. Moreover, the term also sometimes describes, as noted above, the signals associated with individual scan lines, and/or with groups of scan lines and/or with all scan lines associated within an image.

The output image signal of the CCU typically is provided to a display unit 120 so as to make available to the user (e.g., a surgeon, patient, surgical team, students or otherwise) a display image from such image signal. Display unit 120 may be variously implemented. As examples, the unit 120 may include one or more, or combinations of, a television, a cathode ray tube (CRT) monitor, a liquid crystal display (LCD)

monitor, a projector, and/or a head-mounted display. Display unit 120 typically is disposed remotely-from (i.e., spaced apart from) CCU 118. Display unit 120 generally is connected to CCU 118 via video cable, RF or otherwise.

Depending on the display unit 120, the image signal generated by CCU 118 may be variously formatted and encoded. Typically, the output image signal is formatted as video and, as such, is encoded as, e.g., composite, Y/C, RGB, YUV, digital or otherwise.

Regardless of the implementation of the display unit 120, the unit preferably is implemented in coordination with other components of the endoscopic imaging system so as to provide enhanced display of a display image for a user (e.g., a surgeon, patient, surgical team, students or otherwise). Such enhancement preferably is characterized by improved uniformity in illumination or optical characteristics of all or part of the display image. In particular, such enhancement in an endoscopic imaging system and applications thereof, including as described above, is desired to provide image signals characteristic of uniform illumination and/or optical characteristics as to the display image via the display unit 120. Toward achieving that, it is desirable to uniformly illuminate a target site and an ideal optical standard such as, for example, a grid target in acquiring an image of that site. That is, it is desirable to distribute light from a light source across the surface(s) of a target site so that, under such illumination, an image of the target site is acquired that evidences uniform light intensity (i.e., the image, if observed through the endoscope, evidences uniform brightness throughout). It is similarly desirable to maintain correlative uniformity through the respective operations of the endoscope 102, the camera head 116, CCU 118 and display unit 120. In other words, it is desirable not only to establish an image's uniform light intensity and/or optical characteristics, but also to maintain correlative uniformity via amplitudes, levels, bits and other applicable parameters of each image signal applicable to and through each component of the apparatus and/or system. Ultimately the display unit 120 is preferably enabled thereby to display a display image characterized by improved illumination uniformity and an optical definition, as to all or some of the display image. (The terms "illumination" and "optical characteristics" are used herein in a general sense. Although they relate thereto, these terms are not intended to be limited to the standard technical term "luminance" which is a weighted measure of spectral energy of selected wavelengths where the weights are determined respecting characteristics of human vision. Rather, the term "illumination" herein more generally denotes notions of brightness and/or light intensity, for any one or combination of wavelengths of light.)

It is similarly desirable to establish and maintain such uniformities under the variety of operating conditions of the endoscopic imaging system. The variety arises through combinations and permutations of: endoscope diameter; light source; the presence of one or more of various endoscopically-introduced instruments (e.g., possibly disposed so that the image thereof is acquired as part of the image of the target site, and which may have, e.g., reflectivity-far greater than any other part of the target site); the physical manipulation, movement or other dynamic aspects associated with one or more of the endoscope and the other instruments during medical procedures; and variations of the target site itself. As to the target site, variations typically arise across the many types and arrangements of organs, muscle, and other tissue found in the patient's body at and around the target site, particularly associated with, e.g., disposition, shape, texture, color, reflectively and movement thereof.

It is recognized here that establishing and/or maintaining such uniformity is not always possible through conventional systems, methods and apparatus. That is, achieving such uniformity is problematic through selection, use and control of one or more, e.g., of: the light source and/or optics; the structures directing the light to the target site; the target site; the technologies for acquiring the image and directing that image to head 116; a conventional head 116; a conventional CCU 118; and/or a conventional display unit 120. Such uniformity tends also to be problematic in the context of dynamic aspects associated with endoscopes and other instruments and/or variations in operating conditions.

Accordingly, in the example embodiment described above, CCU 118 generates an output image signal which image signal generally reflects correction, in whole or in part, of an image signal representing an image. CCU 118 provides for correction from, based on or otherwise associated with an image signal, which image signal typically is generated by the head 116. That correction preferably is directed to all of the image signal characteristic of non-uniform illumination and/or non-uniform optical characteristics; however, correction may also be directed to less than all of the image signal characteristic of non-uniform illumination and/or non-uniform optical characteristics (whether such is predetermined, automatically selected, manually selected, combinations of these or otherwise).

Moreover, CCU 118 preferably so provides correction no matter the source of non-uniform illumination or optical distortion associated with an image or image signal. Typically, correction preferably is provided for non-uniform illumination associated with the target site itself (e.g. an image signal is characteristic of non-uniform illumination based on difficulties, shortfalls or other problems associated with illuminating the target site, in any one or more of light transmission, reflection, or capture). Moreover, correction preferably is provided for non-uniform illumination associated with other sources (e.g., such image signal's characteristic of non-uniform illumination is associated with shortfalls in components, processes or other technology). Correction preferably is provided for sources of non-uniform illumination, whether automatically or by manual selection, or some combination. That is, CCU provides correction of flaws, variations or other characteristics in image signals arising from non-uniform illumination of the target site and/or one or more of shortfalls in image acquisition, image maintenance, image signal generation, image signal propagation, etc. (Accordingly, the term "non-uniform illumination" is used herein to refer to any characteristic non-uniform illumination that may make correction desirable.)

It is contemplated that CCU 118 may be implemented so as to provide correction relating to characteristics of non-uniform illumination, whether such characteristics are (i) present in the image signal received by the CCU 118, or (ii) are introduced by the CCU 118, or (iii) are introduced subsequent to the CCU 118 (e.g., via a display unit 120, such that CCU is implemented to characterize the operation of the display unit so as to correct in anticipation of such operation). It is also contemplated that the correction be provided by components other than or in addition to CCU 118, such as, e.g., in association with either head 116, display unit 120, both, or other components.

As used herein, the term "correction" is used to encompass each and every, individually, in groups and collectively, of compensation, correction, modification, enhancement, and other similar terms or expressions, when used in connection with any and all changes made to image data and/or image signals responsive to characteristics of non-uniform illumination. Moreover, the term "correction" is used to encompass complete, substantial, significant or other change made to image data and/or image signals (or otherwise) responsive to characteristics of non-uniform illumination.

Regardless of which component(s) of an endoscopic imaging system participate in correction of an image signal, correction according to the invention preferably is implemented via circuits, chips, modules, FPGA's, CPLD's, ASIC's, firmware, code or other hardware, software and/or technologies enabling, supporting or otherwise effecting digital signal processing. That is, it is understood that digital signal processing preferably provides for correction of image signal(s) characteristic of non-uniform illumination. Moreover, digital signal processing preferably also provides for handling (e.g., reporting) of defective imaging elements. Digital signal processing preferably also provides for substantially correcting an image signal associated with defect, failure, or performance degradation, of one or more imaging elements. Digital signal processing preferably also provides for correction moderation (e.g., in the event that image data values approach and/or exceed dynamic range, as described herein), and/or counter-translation operation(s) (e.g., where the user is shielded from observing changes in the display image location and/or orientation on the display unit, even though the image's incidence on the imaging detector changes), and/or centering operation(s) (e.g., regardless of where the image is incident on the imaging detector, the display image is actively translated so that the image's pixels are centered, or substantially centered, in the viewable area of the display unit).

In endoscopic imaging systems, the characteristic of non-uniform illumination typically is observable when imaging an optically target site that is flat, white and of uniform reflectivity (e.g., a white board). In doing so, the image so acquired and output by the endoscope tends to evidence non-uniform illumination by having relatively lower light intensity (also sometimes referred to herein as "brightness") toward and at the outer periphery of the acquired image, and relatively higher light intensity and improved optical characteristics toward and at the center (or some more central region) of the image. Indeed, non-uniform illumination tends to be evidenced in an acquired image by a roll-off of light intensity or irregular optical quality in radial transitions from a center/more central part of the image to a periphery/more peripheral part of the image. For convenience, images evidencing this characteristic are sometimes referred to as having "a roll-off signature".

The characteristic of non-uniform illumination so evidenced in an image typically is propagated to and evidenced in image signals representing such image. In particular, when the imaging detector generates image signals associated with scan lines, image signals characteristic of non-uniform illumination and optical characteristics typically are evidenced, e.g., via amplitude profiles of non-ideal waveform. To illustrate, assuming a selected scan line correlates to a diametric transition across a generally-circular image having a roll-off signature, the associated image signal will tend to have an amplitude or non-linear profile characterized by relatively lower amplitudes in the portions thereof associated with the image's periphery and relatively higher amplitudes in the portions thereof associated with the image's center (or a more central region). The image signal's amplitude profile will tend to be characterized by a roll-off in amplitudes, such roll-off correlating to the image's roll-off in light intensity non-uniform optical characteristics in radial transitions from a center/more central part of the image to a periphery/more peripheral part of the image.

Figure 2:
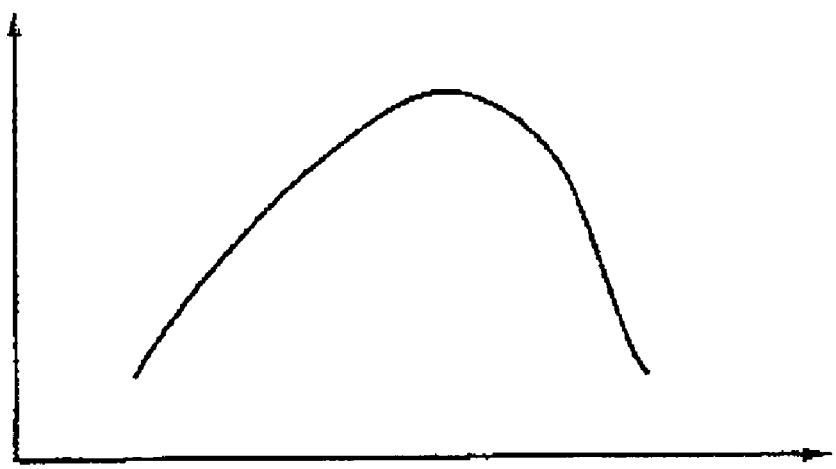
FIG. 2 is an illustration of an amplitude or target profile of an image signal associated with a scan line (vertical axis) versus position along a scan line (horizontal axis).

One such non-ideal amplitude profile is illustrated in FIG. 2. In this illustration, the vertical axis is the amplitude associated with the image's light intensity, for a single scan line; and the horizontal axis corresponds to position along the scan line of the image. (In a similar manner, a non-ideal amplitude profile for optical distortion can be shown using an optical grid.) As such, the profile has lower amplitudes at the beginning and ending portions of the scan line, and higher amplitudes in a central portion of the scan line. While the illustrated non-ideal profile has the appearance of a Gaussian or Gaussian-like waveform, it is recognized that non-ideal profiles may have these or other waveforms, including waveforms that are less symmetrical and/or smooth.

Figure 3:
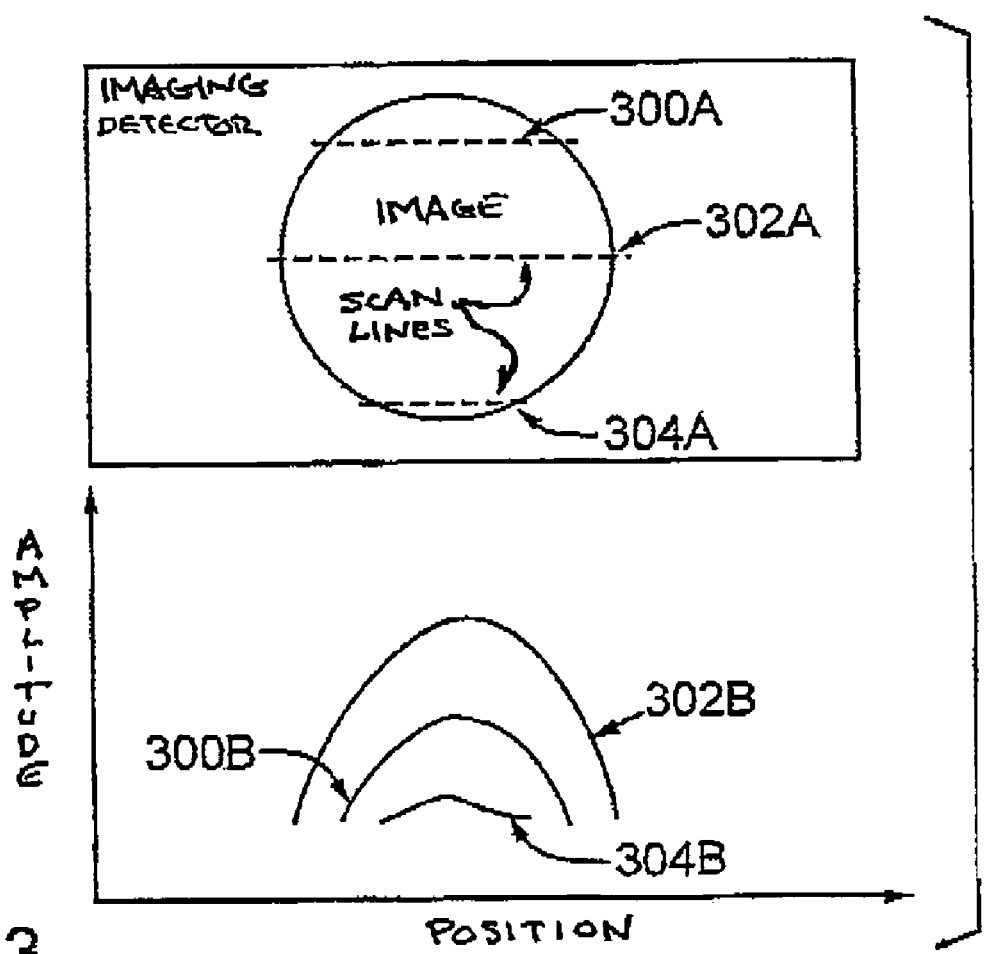
FIG. 3 is an illustration of a generally circular image as it may be incident on an imaging device, with example scan lines associated therewith, and amplitude profiles corresponding to such scan lines.

Turning to FIG. 3, a generally circular image is shown as it may be incident on an imaging device, with example scan lines associated therewith, and example amplitude profiles corresponding to such scan lines. Illustrated here is that image signal amplitude profiles generally vary as to a particular image (see profiles 300B, 302B, 304B). More specifically, profiles generally vary in waveform, scan line to scan line, for the image signals representing the particular image. This follows because image signals are generated via a set of scan lines for a particular image and the scan lines tend to vary, e.g., as to location and length (see, scan lines 300A, 302A, 304A corresponding respectively to profiles 300B, 302B, 304B). The scan lines typically correlate to rows of imaging elements of the imaging detector's typically rectangular array (e.g., a CCD array). However, images tend to be generally circular as incident on such rectangular array. Accordingly, the imaging detector generates image signals associated with respective scan lines slicing the circular image, e.g., from top to bottom.

In so slicing, the scan lines divide the image in respective geometric chords. Generally, the image's geometric chords have (a) progressively lesser lengths toward, adjacent and at the incident image's top and bottom peripheries and (b) progressively greater lengths toward, adjacent and at the image's center region (e.g., a diameter). The image's geometric chords also typically exhibit respective roll-off brightness signatures, with such signatures typically having (a) progressively lower peaks (and, thus, lower roll-off) toward, adjacent and at the image's top/bottom periphery and (b) progressively higher peaks (and, thus, higher roll-off) toward, adjacent and at the image's center.

In such case, the image signals' amplitude profiles tend to correlate to the respective signatures of the geometric chords of the scan lines. Accordingly, the amplitude profiles generally have waveforms that (a) are of relatively shorter duration and lower peak amplitude and roll-off if the image signals correspond to image chords toward, adjacent or at the top/bottom periphery, and (b) are of relatively longer duration and higher peak amplitude and roll-off if the image signals correspond to image chords toward, adjacent or at the image's center.

More specifically, amplitude profiles tend to vary in waveform based on various factors. These factors generally are associated with variety of operating conditions, e.g., as to the target site, the endoscopic imaging system employed to acquire an image thereof and/or the medical procedure being performed. The factors include, but are not limited to: (a) the diameter of the endoscope; (b) the parameters and performance characteristics of each of the light source 112, the fiber bundle 114, the light guide 108, and other components of the system; (c) the presence, appearance, nature and use of other medical instruments in and around the target site; and (d)

parameters associated with the target site itself (e.g., the type, disposition, appearance and movement of organs, muscle and other tissue).

Amplitude profiles characteristic of non-uniformity tend to have non-ideal waveforms based on various individual non-uniformities, or combinations of non-uniformities. For example, non-uniformities may arise in a light source 112, as the source may not generate uniform light intensity, e.g., due to a shadow of the filament in the light source, or variation in temperature across a filament or filaments. Non-uniformities may also arise in the fiber bundle, e.g., as the bundle may fail to both capture and transmit light uniformly. Non-uniformities may also arise in the light guide 108 of the endoscope 102, e.g., as the guide may fail to funnel light uniformly from the bundle or through the distal end of the endoscope 102. Non-uniformities may also arise in capturing an image, and/or in carrying the image to the imaging detector, and/or in directing the image to be incident on the imaging detector's array of imaging elements, and/or in one or more of generation, transmission, reception, distribution, propagation or other use of image data and/or image signals. Non-uniformities may also arise over time, including, without limitation, through wear and tear (e.g., individual fibers of the fiber bundle and/or light guide may break). Non-uniformities may also arise through use of the endoscopic imaging systems such as, for example, via swapping of endoscopes during a medical procedure or use of non-ideal optics.

Because non-uniformities may arise over time and through use of the endoscopic imaging system, an example embodiment of the present invention provides, enables or otherwise supports updating correction in connection with changes in the system, particularly in non-uniformities. It is desirable that updating correction is implemented so as to be achieved on one or more of a schedule, based on specific events or otherwise automatically; however, it is understood that updating correction is implementable so as to be triggered manually (e.g., at the selection of a user), or so as to be a combination of automatic and manual.

In an example embodiment of the present invention, a characterization trigger operation is employed. A characterization trigger operation, as described further below, generally triggers acquisition of image data associated with an image acquired of a reference target. It is to be understood that such operation may be employed to enable correction operation(s) (e.g., to set DSP operation so as to turn on correction operations for application on image data for images acquired in medical procedures). In addition, such operation may be employed both to so trigger and to so enable, and/or to initialize or initiate other more specific or more general task(s), function(s) and/or operation(s).

Where any such characterization trigger operation is employed, it may be implemented so as to be performed as part of, or in association with, another implemented process. One such process is a white balance process. A white balance process typically enables a conventional endoscopic imaging system to enhance the accuracy of color in a display image. To do so, a white balance process typically calibrate the video image signal for accurate color reproduction in different lighting conditions, e.g., by enabling adjustments in image signals and image reproduction based on a determination of the ratio of red, green and blue color components in the light illuminating the target site. Because white light is the combination of these component colors, enhanced establishment and maintenance of white light reproduction (e.g., through one or more initiations of a white balance process) generally enhances the system's reproduction of all colors.

An endoscopic imaging system according to the invention may implement white balance processes in various ways, including via either or both automatic and/or manual modes. In a manual mode, a user sets the white balance by pointing the endoscope at a selected reference target and triggering the process (e.g., via pushing a button). The reference target preferably is of a selected white color, has a flat surface, and is of uniform or substantially uniform reflectivity (a "white target"). The white target preferably also fills the field of view of the endoscope. Having acquired an image of a white target, the system compares the color ratio thereof against a standardized ratio for white color (i.e., in video, 30% red, 59% green and 11% blue) and adjusts color acquisition and/or reproduction so as to properly compensate.

While a characterization trigger operation according to the invention can be performed as part of, or in association with, a white balance process, the characterization trigger operation can be otherwise implemented. However, the white balance process provides a convenient vehicle to implement the characterization trigger operation because:(a) white balance processes are generally understood and in practice with current users of endoscopic imaging systems; (b) white balance processes generally implicate use of both a reference target and an initiation event, each of which is useful in one or more embodiments of a characterization trigger operation and (c) white balance processes are generally recommended to be done whenever the system changes (e.g., when the light source, or fiber bundle, or endoscope, or other component of the system is turned on or changed). With each such initiation of the white balance, updating correction according to the invention preferably is simultaneously triggered.

In an illustrative embodiment of the present invention, a white balance process is employed as part of, or in association with, a characterization trigger operation of a correction operation. In doing so, the white balance process typically entails having the endoscope directed to a white target in order to capture white balance data for some portion(s) or all of an image acquired of the white target. Typically, in such example embodiment, the acquired image's white balance data would have associated image signals which tend to have non-ideal amplitude profiles (including, e.g., the above-described Gaussian-like waveforms, together with timing and control signals at the beginning and end thereof (not shown), as would be apparent when observed by instrumentation, such as an oscilloscope). While the image signals' amplitude profiles so indicate variation in illumination, brightness and/or intensity of the image, the profiles may reflect no aberration in white balance. That is, while intensity may vary across one or more scan lines, a consistent or substantially consistent ratio among the color components may be maintained at each pixel thereof. Accordingly, when the white balance process is initiated and white balance set up, subsequently acquired image signals may continue thereafter to evidence non-ideal waveforms in amplitude profiles (i.e., the image-signals may still be characteristic of non-uniform illumination.

In an embodiment wherein the initiation of a white balance also enables correction in accordance with the invention, so initiating results in the application of at least one signal conditioning operation (e.g., via digital signal processing) providing correction. As a result of a correction, the display image is enhanced, e.g., becomes of substantially even brightness and substantially distortion-free. In other words, the one or more image signals associated with an image are conditioned so that the amplitude profiles thereof have waveforms that are ideal or approach ideal, e.g., achieving or approaching a rectangular, or square, wave with a selected step amplitude (i.e., as viewed on an oscilloscope).

Because images of the target site are generally circular and tend to have a roll-off signature, correction generally affects the image signals (or parts of image signals) which represent the image's central region to a relatively smaller degree, while affecting the image signals (or parts of image signals) which represent the image's periphery to a relatively greater degree. Typically, image signals (or parts of image signals) which represent the image's periphery tend to be increased in amplitude while image signals (or parts of image signals) which represent the image's central region tend to be maintained (or in some cases reduced) in amplitude.

In one aspect of the present invention, use of a non-ideal reference target is accommodated. As mentioned above, a characterization trigger operation typically entails use of a reference target and, in turn, a white balance process also entails such use, i.e., specifically of a white target. However, a user may elect to use a target, such as a piece of white gauze or cloth, particularly in the course of performing a medical procedure where such targets tend to be readily available. In that case, pattern and/or texture of the target will be detected by the imaging detector (e.g., a shadowing effect) and will be manifest in the imaging signal(s) as one or more high frequency artifacts, e.g., a noise signal riding on the top of the signal's amplitude profile. While such artifacts may or may not have significance in the white balance process, correction generally will be subject to such artifacts.

An example embodiment of the present invention responds to use of a non-ideal reference target and, particularly, to the high frequency artifacts associated with such target. To do so, artifacts are removed, in whole or substantial part. Removal typically is accomplished via a filtering function such as, e.g., a digital low pass filter adaptive to the artifacts' frequencies in light of the image signals' frequencies. Moreover, the filtering function typically is accomplished via software (e.g., directing a digital signal processor), but can also be accomplished via filtering hardware (e.g., dedicated filtering logic), or a combination of same, or otherwise. More particularly, by comparing the rate of change of in the amplitude (e.g., brightness) of an image signal's profile, i.e., from one end of a scan line to the other, the artifacts (i.e., spikes) may be detected at a particular pixel, or in groups of pixels, or in a range of pixels. That is, changes above a pre-determined threshold in the brightness or distortion value(s) of and among pixels (particularly, proximate pixels) can be identified to be caused by a non-ideal reference target, rather than by non-uniform illumination. In identifying the spikes, both high-going and low-going changes preferably are identified. Moreover, the width of the spikes preferably is identified and the appropriate range of pixels is determined so as to change the brightness value(s).

By appropriately dealing with the artifacts, potential correction errors are addressed. That is, if correction operations were to proceed in the presence of such artifacts, some pixels would tend to be improperly corrected. Moreover, to address potential variations in the relationship between the artifacts and the image signal, the filtering function preferably is adaptive, e.g., by maintaining a cut-off frequency responsive to the artifacts' characteristics.

While correction of image signals generally is desirable, it is also desirable to avoid improper correction. As described in connection with FIGS. 2 and 3, image signals tend to have non-ideal amplitude profiles and tend to vary scan line to scan line across the image. Accordingly, if fixed correction is applied to all image signals (e.g., regardless of the associated scan line), some signals may be fully, or at least adequately, corrected, while other signals will tend to be improperly corrected (i.e., over- or under-corrected), in whole or in part. Indeed, for those signals that are not adequately corrected, fixed correction may tend to exacerbate the applicable characteristics of non-uniform illumination. For example, fixed correction across various image signals may be accomplished via multiplying, pixel by pixel, the image data thereof in accordance with values of a fixed correction signal having an inverse-Gaussian shape, but doing so will tend to improperly correct pixels in some image signals. In this example, improper correction may arise when such fixed correction signal is based on a diameter of the image and is applied to image signal(s) associated with peripheral geometric chords of the image. Because peripheral geometric chords lead to shorter duration signals than does a diameter, this example correction will tend to be improper (e.g., for portions of the image signals having zero or near-zero amplitude, i.e., corresponding to imaging elements in the imaging detector's array on which the image is not incident), as those portions will tend to be corrected, notwithstanding that any correction of these portions generally should be avoided.

Accordingly, in one aspect of the present invention, correction is determined and provided for image signals on other than a fixed basis. For example, in an image signal in video format, correction is determined and provided pixel by pixel, scan line by scan line, field by field. In a more general example, correction is via correction factors (e.g., correction factors for each or selected scan lines, and/or for each or selected pixels, and/or for other selected individual or group(s) based on selected granularity). Once the correction factors are determined, they preferably are stored or otherwise made available in the endoscopic imaging system so that they can be appropriately applied. Additionally, the correction factors preferably are synchronized to image signals/pixels (e.g., to the portion of the scan lines associated with the incident image). In this way correction tends to be avoided as to those portions of the image signals that should not be corrected, e.g., that properly have zero amplitude.

In another aspect of the invention, correction responds to changes in the endoscopic imaging system leading to differences of alignment and/or orientation respecting the incidence on the imaging detector of the target site's image and the reference target's image. Alignment differences arise when (a) an image of the target site becomes incident on the imaging detector in parts of the array at which the reference target's image was not incident and/or (b) an image of the target site is no longer incident on parts of the array at which the reference target's image was previously incident. Orientation differences arise when the target site's image rotates relative to the array, such that the image is no longer rotationally oriented in incidence on the array as the reference target's image was oriented when correction factors were established (e.g., correction factors for a pixel in the image signal associated with the reference target in an upper portion of the array may be directed to correct, based on rotation, a pixel in the image signal associated with the target site in a portion of the array other than the upper). In either/both cases, correction responds so as to establish proper association between image signal(s) and correction factors.

Correction coefficients, as used herein, refer to values that are used in various embodiments of the present invention to correct image signals. The actual methods and apparatus for making these corrections may vary with different embodiments of the present invention. In doing so, correction coefficients generally are used in a computational operation provided via digital signal processing. As examples, correction coefficients may be added to, subtracted from, and/or multiplied with image data of a particular, group or range of pixels. In these and other cases, the correction coefficients are used to effect a correction in one or more pixels so as to enhance the display image (e.g., such that the display image displayed from the corrected pixels represents the target site as if the target site was uniformly, or substantially uniformly, illuminated). Similarly, the corrected pixels may represent the target site as if all or substantially all of any defective imaging elements have been repaired.

Correction coefficients preferably are generated for selected image signals and/or portions of signals. In video formats, correction coefficients may be generated in various operations, but preferably are generated pixel by pixel, or in groups, patterns or ranges of pixels, for selected scan lines (individual, groups, patterns, all, etc.), for one or more fields, and/or for one or more frames. Such generation preferably is accomplished in connection with a characterization operation. Typically, in the characterization operation, image signals are acquired in imaging a reference target. As previously described, a characterization operation may be triggered via a white balance process.

Figure 4:
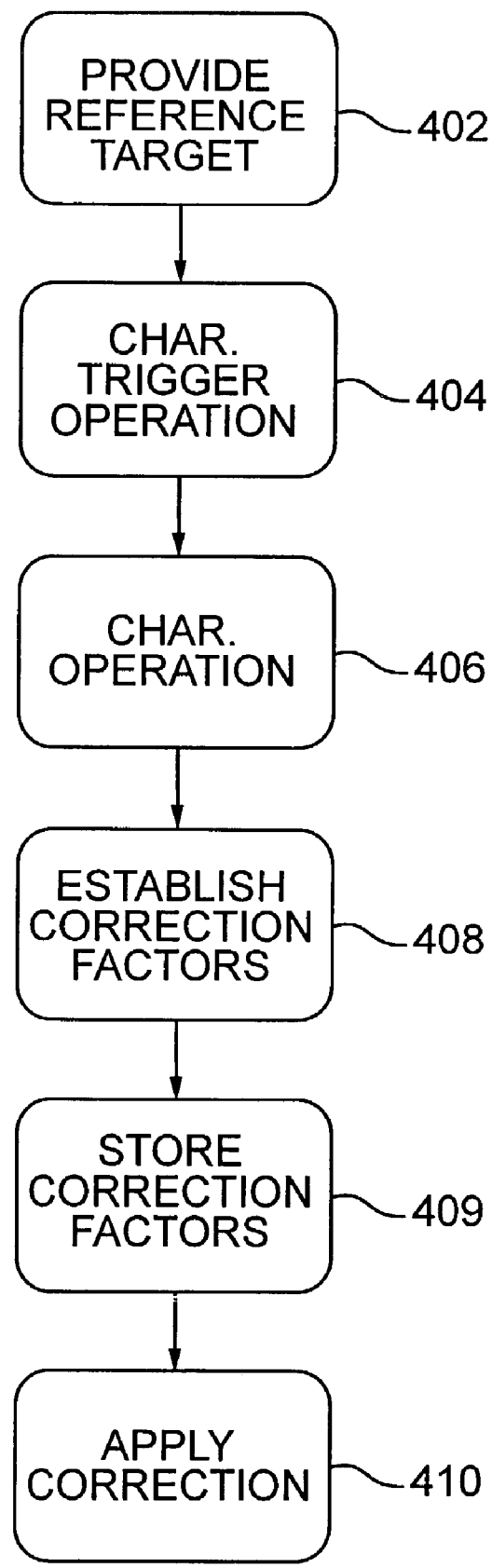
FIG. 4 is a flow diagram of an illustrative process in accordance with the present invention wherein correction coefficients are generated and applied to correct an image signal.

Referring to FIG. 4, a flow diagram is shown of an illustrative process 400, in accordance with the present invention, in which correction coefficients are generated and applied to correct an image signal. More particularly, process 400 includes providing 402 a reference target for which an image may be acquired by the endoscopic imaging system. In one embodiment, this is accomplished by pointing the distal end of the endoscope (i.e., the image acquiring optics thereof) at a reference target (as previously described).

In a typical embodiment, with the reference target provided, a characterization trigger operation is initiated 404. As described above, the characterization trigger operation may be implemented using a white balance process, in which case the reference target generally is a white target.

The characterization trigger operation, as initiated, triggers a characterization operation 406. The characterization operation 406 comprises acquiring image signals associated with the reference target. Preferably, this acquisition is comprehensive of the reference target. In any case, the acquired image signals generally have amplitude profiles associated with respective scan lines. Via the acquired image signals or otherwise, image data is made available, e.g., available pixel by pixel, by groups of pixels or by ranges of pixels or in such other manner as is consistent with an operation by which correction factors are to be generated. That is, the acquisition of image signals/image data enables analysis and other processing of the acquired signals/data resulting in establishment of selected correction factors, e.g., as correction coefficients or otherwise, and in selected granularity.

With the acquisition of image signals/data, correction factors are established 408. In a typical embodiment, establishing correction factors comprises generating correction coefficients. Generally, corrections coefficients are generated using a correction coefficient algorithm.

In an example embodiment of the present invention, correction coefficients are generated by a process including comparing (a) selected image data associated with the reference target's image to (b) a reference value. This comparison preferably is conducted in contemplation of a transformative function (e.g., multiplication, division, etc.) by which correction coefficient(s) are to be applied to correct image data associated with the target site's image(s) (e.g., acquired during a medical procedure). For example, if a coefficient is to be applied to correct image data via multiplication, the coefficient may be generated by dividing the reference value by the image data associated with the reference target. In another example, the coefficients may be set using a look up table having entries with values determined based on the organization and operation of the endoscopic imaging system, including selected correction.

In any case, correction factors such as correction coefficients preferably are established so that, when applied to correct image data, correction is achieved. So as to enhance such application, the correction factors preferably are stored 409. Where image signals call for high speed correction (e.g., in video format with relatively high pixel numbers), the correction factors, e.g., coefficients, typically are stored in a memory having sufficiently fast access times so as to enable such correction. In an example embodiment, the correction factors are stored in a granularity consistent with the correction operation (e.g., if correction is pixel by pixel, a correction coefficient is stored for each pixel).

In the illustrative embodiment shown in FIG. 4, with the correction factors established, the endoscopic imaging system applies 410 such factors to image data associated with a target site. In a typical example, target site image signals are corrected by the application of correction coefficients signals' image data via a selected transformative function. Correction coefficients may be generated in connection with various reference values. As an example, the reference value can be obtained by inspecting the amplitude profile of an image signal associated with a diameter (or diameter region) of the reference target's image. In doing so, the reference value can be set as the profile's peak value for a particular image signal, a peak value among that image signal and various other image signals, or as some such peak value subject to a selected scaling factor (e.g., a 0.707 multiplier), or based on some other calculation involving one or more values associated with the diametric profile and/or one or more of the amplitude profiles.

As another example, the reference value can be obtained based on other selected image data. That image data may be associated with one or more pixels, in groups, patterns or ranges, for selected scan lines (individual, groups, patterns, all, etc.), for one or more fields, and/or for one or more frames. In that regard, the reference value may be obtained via histogram analysis of the selected image data, e.g., by counting the number of pixels with image data having various value ranges and, with same, making a determination based on a selected operation.

Histogram and other computational analysis may be implemented to respond to the endoscopes diameter (e.g., larger diameter, more pixels; smaller diameter, fewer pixels). Such analysis also enables rejection (i.e., tossing out) of image data associated with selected pixels (e.g., based on being too high and/or too low). Such analysis also enables branching determinations as to correction operations, which branching determinations include, as examples, whether to proceed with the correction operation (e.g., defeating correction entirely) and whether to change correction operations (e.g., shifting to one or more different transformative operations), such determinations typically being based on established performance conditions (e.g., defeat correction if image data evidences undesirable insufficient or wild variations in values).

The reference value can be an average picture level ("APL"). The APL can be variously established. As an example, the APL may be pre-set (e.g., a parameter of the head 116, particularly the head's imaging detector). The APL may also be set by the user. As an example, the user may enter that information into the CCU.

The APL may also be determinable. In that regard, the APL may be determinable, e.g., by the CCU, as a function of various factors, including the type of medical procedure for which the endoscopic imaging system will be used. For example, in a gas environment (such as when a human body cavity is distended with gas), the APL typically may be lowered so as to reduce glaring. The APL may be determinable via various calculations or computations, including, e.g., by applying an average, median or other function on image data (and/or histogram data associated therewith) for one or more pixels comprising the acquired image of the reference target, with or without tossing out image data for defective pixels, and with or without pre-filtering aberrant artifacts. The pixels in such determination can be predetermined, adjustable, selected, or otherwise, static or dynamic. The pixels can comprise (i) groups of pixels associated with selected portion(s) of the image detector's array whereon the reference target's image is incident, (ii) pixels across all or part of a selected scan line, (iii) pixels for all or part of a field(s), (iv) pixels for one or more frames, (v) pixel set by combinations of these selections, or (vi) pixels set via other selections.

The APL can also be adjustable, where adjustment is automatic, manual, triggered, dynamic or some combination. Automatic APL adjustment, for example, may operate in response to detected circumstances, including discovery of the selected components (e.g., the endoscope) of the imaging system, and conditions at the target site that implicate the quality of the display image. Providing an adjustable APL provides for updating correction responsive to changes in the endoscopic imaging system. As an example, in medical procedures, if the display image is tainted by excessive glare (which is a subjective assessment on the part of a user), the APL can be adjusted to reduce such glare.

Depending on the implementation, the number of correction coefficients to be generated and/or applied can vary. Generally, however, the number of correction coefficients tends to be relatively large. A large number of coefficients arises, e.g., if one coefficient is generated for each pixel of a full frame of pixels (and the number of pixels generally increases with the endoscope diameter). To reduce the number of generated coefficients, various options are contemplated. One example option is to generate coefficients for blocks of pixels of a frame (i.e., single coefficients apply to respective blocks of pixels, rather than having each coefficient apply to a single pixel). Another example option is to generate coefficients for all pixels but for just one field in a video-formatted image signal, with such coefficients being applied to either or both fields of frames of that signal. The determination of how and whether to generate and apply correction coefficients (e.g., on a pixel-by-pixel basis, or on a block-by-block basis, or otherwise) may be made automatically (e.g., via CCU 118), or manually by, e.g., the user, or otherwise. In any case, it is desirable to generate and apply coefficients efficiently.

Figure 5:
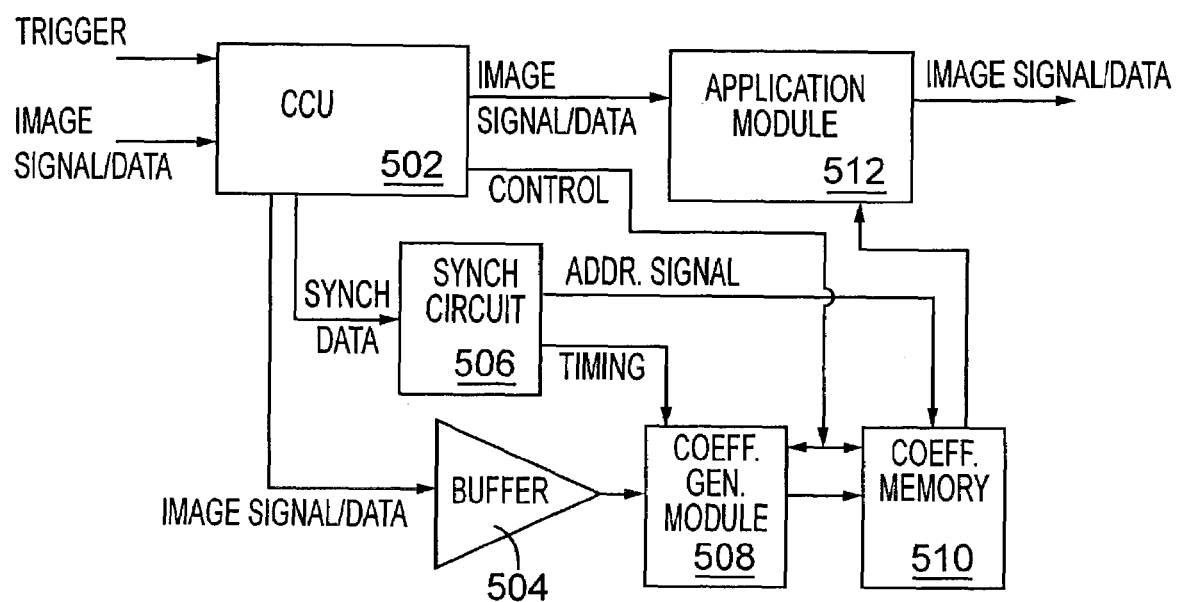
FIG. 5 is a block diagram of an example circuit in accordance with the present invention.

Referring to FIG. 5, a block diagram is shown of an example circuit in accordance with the invention. The circuit provides functionality for generating and applying correction coefficients. As discussed further below, some or all of the algorithms, functions or operations associated with generating and applying correction coefficients may be implemented in software, such software being executed on or in a processor (e.g., a microprocessor, digital signal processor, field programmable gate array (FPGA)), rather than being implemented completely in hardware (e.g., logic). It is also recognized that, although algorithms, functions and operations associated with generating and applying correction coefficients are described as implemented in circuit components separate from CCU 502, some or all of such functions and operations can be implemented as part of the CCU.

In FIG. 5, CCU 502 is coupled to a source of an image signal, such as, for example, an imaging detector. CCU 502 is further coupled to a signal source that provides a signal that initiates a characterization operation, such as, via a white balance operation. CCU 502 has a plurality of output terminals adapted to provide image signals/data, one or more control signals, and synchronization data.

In the illustrative embodiment, a buffer circuit 504 is disposed in the electrical pathway between, and is coupled to both, CCU 502 and coefficient generation module 508. Those skilled in the art and having the benefit of this disclosure will recognize that such buffer circuitry may or may not be required depending on the drive capability of the output circuits within CCU 502, and the parasitic loading imposed by the electrical pathway between CCU 502 and coefficient generation module 508. It is understood that the buffer 504 may be implemented to provide a filter function, such as that previously described respecting high frequency artifacts associated with using a non-ideal reference target.

Coefficient generation module 508 has at least one output terminal coupled to coefficient memory 510 for communicating correction coefficients to coefficient memory for storage therein. Coefficient generation module 508 contains logic that operates in accordance with a predetermined correction coefficient algorithm to generate correction coefficients. It is noted that correction coefficients may be generated having various granularity, such as, e.g., for individual pixels, linear groups of pixels, two-dimensional blocks of pixels or otherwise. It is also noted that the specific logic used in coefficient generation module 508 depends on that granularity, as well as on the transformative function of the correction operation by which correction coefficient(s) are applied to correct image data associated with the target site's image(s) in an application module 512. It is within the ordinary skill in the art to implement such logic, or software (if implemented in software), or both.

A synchronization circuit 506 is coupled to CCU 502 so as to receive therefrom synchronization data (e.g., video timing data if the image signal is in a video format). Synchronization circuit 506 is operable to produce a timing signal at a first output terminal, and to produce an address signal at a second output terminal. The timing signal is coupled to coefficient generation module 508 and provides that module with information enabling the module, as to image data received from buffer 504, to distinguish the image data actually representing an image from collateral information that may be present and to operate thereon in light of the disposition of the pixel in the imaging detector's array.

The address signal of synchronization circuit 508 is coupled to coefficient memory 510. This address signal may be implemented as a serial or parallel interface. The address provided is used to determine the location in coefficient memory 510 where correction coefficient(s) are to be stored. Typically, this address is a function of an x-y coordinate set that correlates a coefficient's storage location with the pixel associated with that coefficient and, generally, that correlation is defined in relation to the pixel (e.g., the imaging element(s) of the imaging detector) associated with the image data used in generating the correction coefficient.

With the generation and storage of correction coefficients, operation of the endoscopic imaging system is set up to take place with correction of image signals characteristic of non-uniform illumination. In an example embodiment, correction may be enabled or disabled. Enabling/disabling may be manual, automatic or some combination. Automatic enablement may be provided via the characterization trigger operation and/or the characterization operation. That is, performance of either may enable correction; in such case, the enablement may be implemented so as to be subject to successful performance.

In a typical embodiment, a correction operation involves providing an image signal associated with a target site, together with correction coefficients (e.g., as established above), to application module 512. As indicated above, application module 512 performs the correction operation by applying the correction coefficients in accordance with the chosen transformative function (e.g., multiplication, addition, subtraction, or any other suitable function).

In image signals having video formats, correction coefficients typically are generated starting with the first pixel of the first scan line of the first field of the first frame in acquiring an image of a reference target. Typically, the image acquisition process (which may be controlled by either hardware or software, or a combination) synchronizes with the image signal after the process is triggered, such that, the frame is captured starting with the first pixel as mentioned above. However, it is understood that both frame capture and correction coefficient generation can start at any scan line and/or pixel position, without departing from the principles of the invention.

Correction coefficients are typically written to one or more memory storage devices at a rate commensurate with the relationship of coefficients to pixels (whether, e.g., one coefficient to one pixel, to one block of pixels, to one field, or to some combination thereof, or to some other granularity). For example, if one correction coefficient is generated for each one of the pixels, and each such correction coefficient is written into memory every 70 nsec (i.e., a typical pixel rate in video), and if the memory is not that fast or faster, then, as those skilled in the art of digital design and having the benefit of the present disclosure will recognize, an interleaved memory architecture can be used to accommodate the required rate a coefficient storage.

Figure 6:
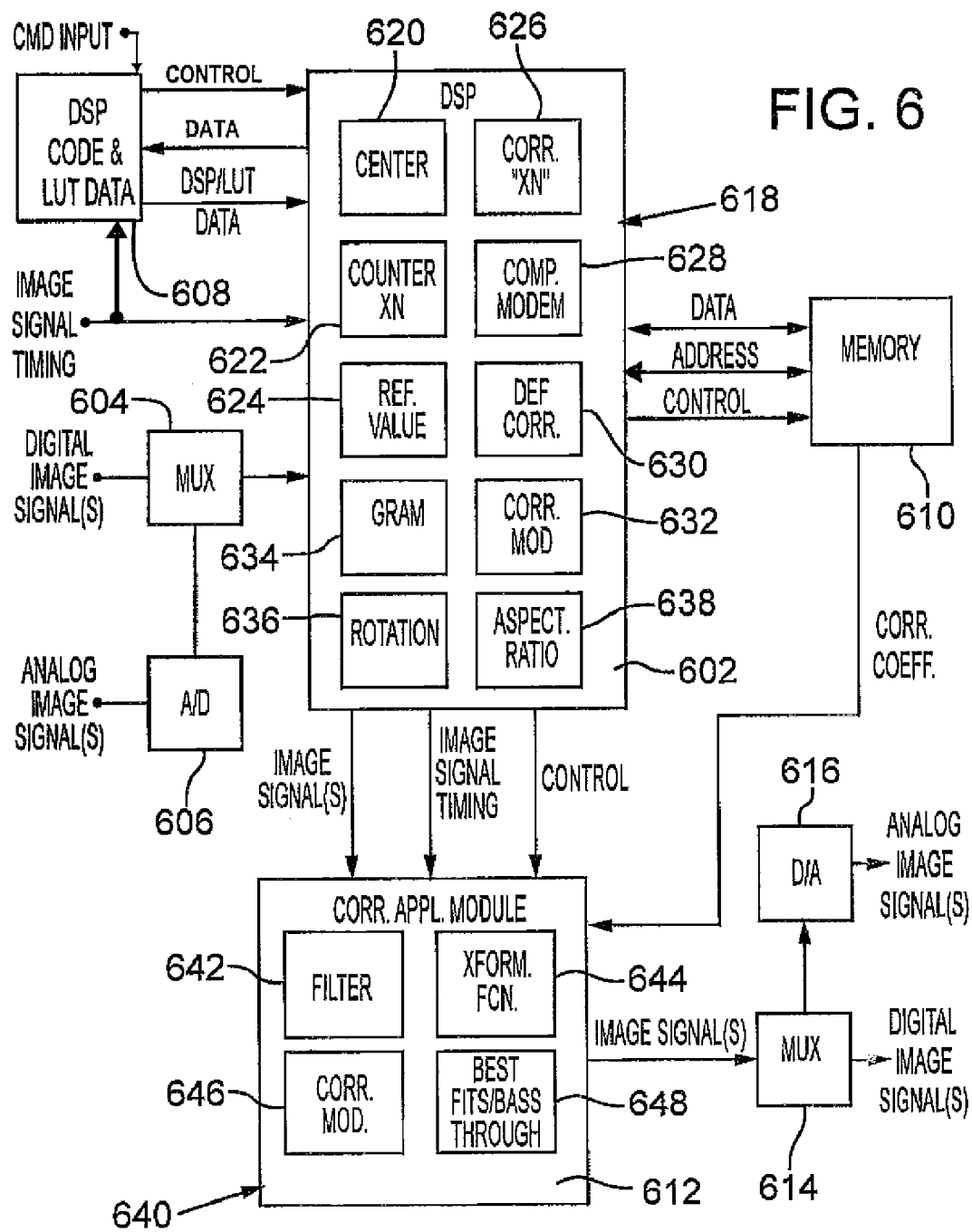
FIG. 6 is a block diagram of an example circuit in accordance with the present invention.

Referring to FIG. 6, a block diagram is shown of another example circuit in accordance with the invention. The circuit provides functionality for establishing and applying correction factors. It is recognized that, although algorithms, functions and operations associated with generating and applying correction coefficients are described as implemented in certain circuit components, some or all of same may be part of CCU 502, and some or all of same may be part of other circuit elements of FIG. 5.

In FIG. 6, digital signal processor (DSP) 602 is coupled to a source of image signal(s), such as, for example, an imaging detector. That coupling is via a multiplexer 604, which multiplexer directs digital image signals from (a) a source of digital image signals and (b) an analog to digital converter 606, for signals that originally are analog.

DSP 602 is also coupled to a source of image signal timing. Such image signal timing is associated with the image signal(s) input to the DSP.

DSP 602 is further coupled to a storage device 608 that stores DSP code and/or look up table data. The storage device 608 receives, as inputs, command input(s) data input(s) and image signal timing. The storage device 608 provides, as outputs, control signal(s), data signal(s), DSP code and/or look up table data, which outputs are directed to DSP 602. Although storage device 608 here is described to support a look up table and associated data (including as an output signal), it is recognized that the storage device 608 may be implemented to omit a look up table and associated signals (e.g., omission is expected if coefficient factors are determined by other than a look up table).

The storage device 608 may be variously implemented. Examples include a read only memory (ROM), cache memory, (static or dynamic) random access memory, flash memory, and a hard drive.

DSP 602 is also coupled to a memory 610. Memory 610 provides for storage and provision of correction factors, e.g., correction coefficients. Memory 610 receives, as inputs from DSP 602, data signal(s), address signal(s) and control signal(s). Memory 610 provides, as outputs, a data signal (directed to DSP 602) and a correction factor signal (directed to a correction application module 612). Memory 610 may be variously implemented; however, as described herein, the memory preferably is designed, fabricated and/or architectured so as to store, access and provide the correction factors timely in connection with the correction operation.

DSP 602 and memory 610 are coupled to the correction application module 612. The module 612 has, as inputs, in addition to the correction coefficient signal received from memory 610, image signal(s), image signal timing, and control signal(s), received from DSP 602. The module 612 has, as outputs, image signal(s) which, generally, are corrected based on the module's application of correction operation(s), the correction operation(s) being based, typically, at least in part, on the received correction factors of the correction factor signals.

Module 612 directs the output image signal(s) to a multiplexer 614. One output of the multiplexer 614 is digital image signal(s). Another output is directed to a digital to analog converter 616 which converts the digital signal to analog so as to output analog image signal(s).

In a typical embodiment, DSP 602 supports one or more feature modules 618. These modules 618 may be implemented in hardware, firmware, software, or otherwise, or combinations, without departing from the invention. (If a feature module employs software, the code enabling such feature generally is stored in the storage device 608.)

Example feature modules include: (a) a centering module 620; (b) a counter-translation module 622; (c) a reference value module 624; (d) a correction translation module 626; (e) a computational analysis module 628; (f) a defect correction module 630; (g) a correction moderation module 632, (h) a granularity module 634; a rotation detection module 636; and an aspect ratio adjustment module 638. As described more fully elsewhere herein, the centering and counter-translation modules 620, 622 provide for perception of the display image in the center of the display unit 120, notwithstanding incidence of an image relative to the imaging detector. As also described more fully elsewhere herein, the reference value module 624 yields a reference value (e.g., a peak value, an average picture level, or the like) employed in establishing correction factors. As still also described more fully elsewhere herein, the computational analysis module 628 (e.g., a histogram algorithm) may be variously employed in connection with, e.g., establishing correction factors. Similarly, the granularity module 634 is employed to determine and implement granularity in various operations, processes and the like (including, e.g., in establishing correction factors and/or in controlling application of correction factors in correction operations) and, as such, is described herein in connection with such various implicated operations, processes, etc. As is also described more fully elsewhere herein, each of the correction translation module 626 and the correction moderation module 632 are implemented to address issues that arise in connection with correction (i.e., in turn, potential mis-alignment and mis-orientation between correction coefficients and the pixels to which they should apply and potential correction that exceeds dynamic range parameters implicated in the endoscopic imaging system). In addition, as is also described more fully elsewhere herein, defect correction module 630 is implemented to address issues associated with defective imaging elements.

In a typical embodiment, correction application module 612 supports one or more application modules 640. These modules 640 may be implemented in hardware, firmware, software, or otherwise, or combinations, without departing from the invention. Example application modules include: (a) a filter module 642; (b) a transformative function module 644; (c) a correction moderation module 646; and (d) a best fit/pass-through module 648. The filter module 642 provides for filtering image data (e.g., via an adaptive filtering function), as described more fully elsewhere herein. The transformative function module 644 provides for application of the correction factor(s) to selected image data via selected transformative functions, as described more fully elsewhere herein. The correction moderation module 646 is also described more fully elsewhere herein; however, it is set forth here to emphasize that correction moderation may be performed via various modules associated with various elements of the endoscopic imaging system, without departing from the principles of the invention. The best fit/pass-through module 648 provides for passing through image data without correction and for correction using "best fit" approaches (e.g., the user switches among best fit offerings embedded in the endoscopic imaging system); the best fit approaches are described more fully elsewhere herein.

In an aspect of the present invention, corrections for individual pixel defects are implemented. Pixel defects typically result from permanent defects in the imaging detector, particularly as to the performance of one or more imaging elements. Accordingly, a pixel defect is evidenced when a particular pixel either is stuck at a dark or light value or outputs an improperly low or high value.

Defect correction preferably is provided in the digital domain. Because the pixels' values are digitized, not only can pixel by pixel adjustments be made to correct for non-uniform illumination, but corrections can also be made for defective imaging elements. In such defect correction, the location, or address, of a defective imaging element typically is determined by comparing the imaging element's image data to the image data of one or more selected (e.g., proximate) imaging elements. In other words, a defective pixel can be determined by comparing the defective pixel to one or more selected pixels, e.g., neighboring pixels.

If the comparison identifies one or more defective imaging elements, defect correction preferably is performed. Defect correction may be variously implemented. Implementations include, but are not limited to: (a) interpolation of image data of selected imaging elements; (b) extrapolation of image data from selected imaging elements; (c) substitution of image data from a selected imaging element; and/or (d) combinations of these. In each case, the selected imaging element(s) preferably are non-defective. As to interpolation, the defective image data typically is replaced by image data obtained by interpolating image data of, preferably, imaging elements disposed on opposite sides of the defective imaging element. Moreover, it is understood that this approach contemplates selection of imaging elements, whether on the same or on one or more adjacent scan lines, whether disposed immediately adjacent, nearly adjacent or otherwise relative to the defective imaging element, and including various combinations (e.g., average interpolated value). In extrapolation, the defective image data typically is replaced by image data obtained by extrapolating image data of, preferably, imaging elements disposed on one side of the defective imaging element. Moreover, it is understood that this approach contemplates selection of imaging elements, whether on the defective imaging element's scan line or on one or more adjacent scan lines, whether disposed immediately adjacent, nearly adjacent or otherwise relative to the defective imaging element, and including various combinations. In an example combination of extrapolation and interpolation, the selected imaging elements are arranged in sets on opposite sides of the defective imaging element, such that extrapolation is performed for each set and the interpolation is performed by averaging the results of the extrapolation.

The defect correction preferably is performed as part of correction respecting non-uniform illumination. In addition, defect correction is understood to be achievable by software, hardware, or a combination of both hardware and software.

In detecting a defective imaging element, the system (e.g., the CCU) preferably is enabled to communicate this information to the user and/or to service personnel. This communication is variously implemented, including by indicator lamps, audible tones, printouts, or any other suitable means, including but not limited to informing another computer over a network connection. Similarly, such information may be wirelessly communicated, e.g., between the CCU and one or more other computers. Such wireless communication may be based upon radio frequency (RF) or infrared (IR) transceivers and protocols which are well known in the field. While wireless communication may be convenient in many settings, it is sometimes preferable—such as in the context of a medical procedure—to maintain wired communication for reliability and noninterference with other equipment.

In another aspect of the invention, alignment and orientation defects are addressed. These defects may occur by displacement, rotation or any other form of translation (hereinafter, the term "translation" includes each of displacement, rotation, or otherwise and/or any combination of same). In that event, these defects manifest as a change in relationship between the imaging detector and the endoscope, such that the target site's image incident on the imaging detector is mis-aligned/mis-oriented from the incidence at which the correction coefficients are/were generated. In any such case, the correction coefficients tend to become inappropriate.

In an example embodiment, the system enables a correction translation process in order to address correction problems arising due to any such translation. Such problems generally may be recognized by a user (e.g., a doctor performing a medical procedure with an endoscopic imaging system) and, as such, may be corrected by the user who, based on that recognition, triggers updating of correction coefficients (e.g., such trigger by initiating a characterization trigger operation, such as a white balance operation). Alternatively, the endoscopic imaging system may detect the problem and, in response thereto, send a notification (such as, but not limited to, an audible tone or illuminated signal lamp) to the user so that the user knows to trigger updating of correction coefficients. System detection of such a problem may be based, e.g., on detecting target site image data incident on parts of the imaging detector array where the reference target's image formerly was not incident. In addition, system detection may also be based, e.g., on not detecting target site image data incident on parts of the imaging detector array where the reference target's image formerly was incident.

In a further alternative, the system detects a problem with the image signal in and/or after application of the correction coefficients and, based on that detection, recognizes the translation of the target image. Responsive thereto, the system re-orders the correction coefficients in the memory (e.g., moves correction coefficients to new addresses based on the image translation) so that the correction coefficients are properly available (e.g., read out in a proper order—by address—for application in a correction operation). In a still further alternative, the system creates an address translation function or table, such that, rather than re-ordering by re-writing the coefficients, the system provides non-sequential addressing of the memory in which the correction coefficients are stored and, thereby, produces the correction coefficients in a proper order (i.e., an order that accommodates translation).

In order to identify the translation mentioned above (i.e., movement of the incidence of the image relative to the imaging detector array), tracking and/or fitting algorithms preferably are implemented. For example, by retaining one or more frames of image data, comparisons can be made to determine the relative changes, or movement, from frame to frame. Various techniques may be used to find where, among the blocks and/or fields the changes have taken place. Identification of an object's motion from frame to frame is well understood; indeed, algorithms and operations for such identification have been developed (e.g., transforms such as the discrete cosine transform (DCT)). To illustrate, in the field of video compression, such algorithms and operations are used to identify what has changed from frame to frame so that only this change information is communicated. Here, using such algorithms and transforms, the translation relationship can be determined by, e.g., iteratively comparing current image data with various selected translation(s) and finding a best fit, e.g., using DCT.

In another aspect of the present invention, a counter-translation operation may be implemented, so that the user is shielded from observing any change (or is limited to only insignificant change) in the display image location and/or orientation on the display unit 120. In a further aspect, a centering operation may be implemented so that, regardless of where the image is incident on the imaging detector, the display image is actively translated so that the image's pixels are centered, or substantially centered, in the viewable area of the display unit 120.

In another aspect of the present invention, dynamic range is addressed. For the imaging detector and other individual components of the system, as well as the system as a whole, dynamic range contemplates the limited range of digital values into which the image data associated with pixels is to fit. As such, dynamic range is addressed typically in connection with correction of image data. Doing so follows in that correction tends to increase amplitudes associated with image data (e.g., in some embodiments, increasing amplitudes for pixels having image data that is below a reference value), which increase may cause dynamic range to be exceeded. Moreover, it is desirable to address dynamic range as exceeding it tends to result in a loss of image detail (e.g., wash out) for the endoscopic imaging system which, in medical procedures, generally is undesirable.

Figure 7:
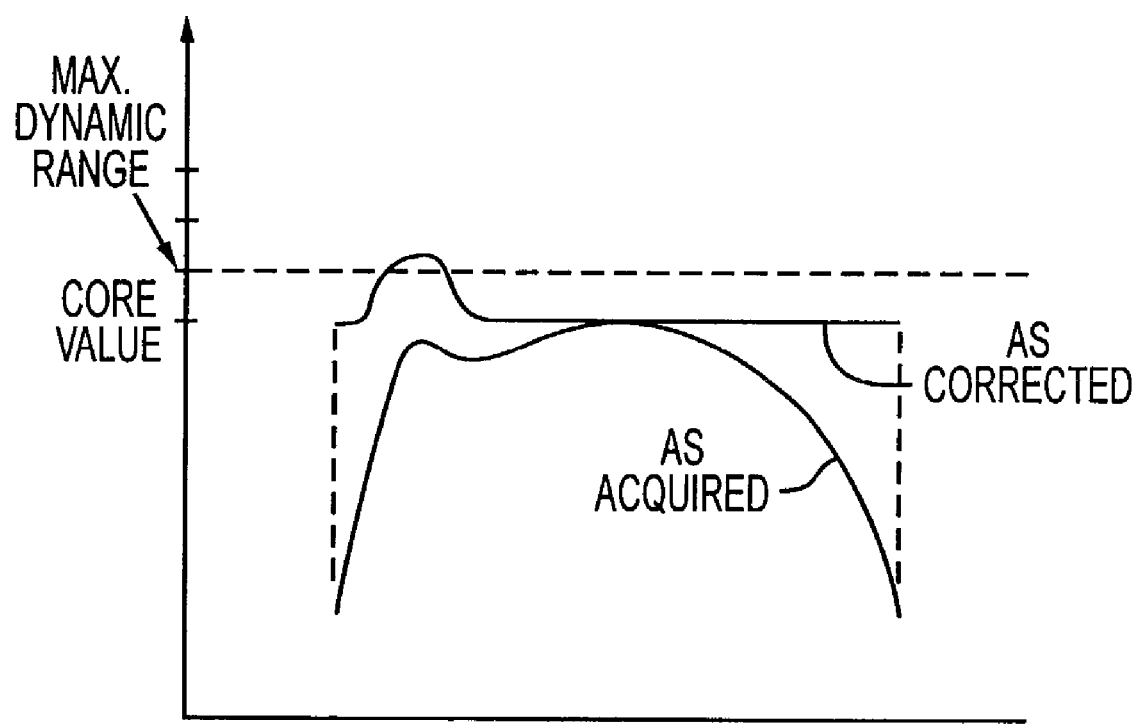
FIG. 7 is a diagram showing an amplitude profile of an image signal and illustrative correction of such signal, in the context of dynamic range.

A typical circumstance implicating dynamic range in the context of correction is illustrated in FIG. 7. There: (a) in imaging a target site, one or more pixels of acquired image data have values nearing the dynamic range's upper limit (e.g., because a highly reflective tissue, bone, instrument, or other material is or becomes disposed in the target site at that pixel's relative position), (b) correction of such data is based on characterization of a reference target having had a lower image data values, and (c) dynamic range is exceeded as to some pixels because correction increases the already-high image data values (e.g., correcting via a multiplication function with an established correction coefficient greater than unity).

In cases such as in FIG. 7's illustration, correction tends to result in exceeding dynamic range, particularly, if a pixel's image data has a value that is relatively large compared to that which was used in setting the pixel's associated correction coefficient. Even so, factors other than the image data's acquired value implicate dynamic range. These factors include the correction coefficient's value, the transformative function, and the combination of these with the acquired image data value in correction operations.

In an aspect of the invention, an endoscopic imaging system addresses dynamic range using correction moderation. Correction moderation entails moderating the correction. Such moderation may be variously implemented. Examples of moderation include, as examples, changing and/or controlling: the acquired image data, the corrected image data, the correction coefficient, the transformative function, or otherwise, individually or in combination. In any case, correction moderation is typically directed toward reducing and/or controlling the values of either/both the acquired image data or the corrected image data. Moreover, correction moderation preferably is dynamic in that it tends to address dynamic range problems as they arise, for the pixels implicated.

However, it is understood that correction moderation may be otherwise implemented, provided the implementation is directed so as to avoid image data exceeding a specified level, e.g., the dynamic range, or some other selected level above or below any such dynamic range, of the imaging detector and/or the dynamic range of other components of the system (alone or in combination). As an example, moderation may be implemented so as to suspend correction when dynamic range is, or is anticipated to be, exceeded (e.g., whether the correction is for some or all pixels) and, later, to restore correction (e.g., for some or all of the implicated pixels), based on either a time out, detection of image data values and/or calculations based on either, or otherwise.

In an example embodiment of the present invention, correction moderation includes tracking image data values (acquired and/or corrected) as these values approach the top of the dynamic range and, depending on the rate of approach, taking action (sometimes referred to herein as "dynamic knee" operations). Such action may be variously implemented. Examples include, without limitation: (a) controlling operations associated with acquiring image data (i.e., controlling operation of the imaging detector or other components, such as by reducing the shutter speed, aperture or otherwise); and/or (b) conditioning the acquired image data prior to the transformative function; and/or (c) conditioning the corrected image data after the transformative function (e.g., via an additional circuit or software function); and/or (d) applying an additional transformative function before/after the transformative function; and/or (e) suspending application of the transformative function; and/or (f) changing one or more correction factors associated with a transformative function; and/or (g) switching to a different transformative function (e.g., switching to a different circuit or software operation); and/or (h) triggering a dynamically changing scale-down factor applicable to or in the transformative function as the rate of change of the pixel values (or components thereof) increases or decreases (e.g., in a multiplication function, triggering a divisor from unity to greater than unity).

Where the transformative function is a multiplication of image data value (or some component of the image data) by the correction coefficient, an example embodiment of the present invention determines the change in value of at least some component of the image data, e.g., across one or more scan lines. If that component is increasing beyond a predetermined rate, correction moderation may be implemented, such as by reducing the correction coefficient prior to the multiplication. It is recognized by those skilled in the art having the benefit of this disclosure that the same result can be accomplished by completing the multiplication function using the original correction coefficient and, subsequently, routing the result so as to apply a scale-down function triggered by detection of the excessive rate. The scale-down function may be variously implemented, including, as examples, e.g., via division by greater than unity or multiplication by less than unity or otherwise.

Where a transformative function uses a reference value in generating correction coefficients, another example embodiment of the present invention provides that the reference value (e.g., an average picture level), is actively re-set, so as to reduce or eliminate the probability of exceeding the dynamic range.

In still another embodiment of the present invention, dynamic range is addressed by controlling operation of the imaging detector or other components in acquisition of image data, particularly by reducing the shutter speed associated with the imaging detector. To do so, in an example, one or more thresholds in connection with correction may be identified, such that, when a threshold is approached or reached, a feedback signal is generated (e.g., by CCU) that is used in, that triggers, and/or that otherwise provides or brings about adjustment of the electronic shutter speed. It is noted that thresholds may be so identified for decreasing shutter speed in relatively lower light conditions and/or for increasing shutter speed in relatively higher light conditions. In the case of higher light conditions, when the upper limit of dynamic range is at issue, the feedback signal brings about increase of the shutter speed so as to reduce the time over which the imaging detector acquires image data (i.e., for a frame or field). This reduced time, in turn, tends to reduce image data's values associated with each pixel in the frame or field (e.g., such values are based on the time integral of the incident light intensity). With such shutter speed adjustments, correction moderation generally covers an entire field or frame(s) of pixels, rather than any moderation on a lesser granularity (e.g., by each pixel or block(s) of pixels).

In another example embodiment, predictive algorithms are used to change dynamically the parameters of correction moderation. Such use of predictive algorithms provides that correction moderation is maintained appropriate to the image data (e.g., corrected image data) associated with image(s) of a target site that tends to be dynamically changing. Moreover, such use of predictive algorithms contemplates that objects giving rise to dynamic range problems (e.g., objects having surfaces of relatively high reflectivity) tend to move relatively slowly and, thus, those movements are readily captured in image data (e.g., at standard video frame rates). As a consequence, the object's movement can be analyzed by the predictive algorithms so as to guide correction moderation. Predictive algorithms to be used in this image processing are known (e.g., such algorithms have application in video compression technologies). Typically, these predictive algorithms benefit from high speed digital processing so as to be completed in only of portion of the time between fields/frames in video acquisition, i.e., with time for correction to be completed.

Predictive algorithms typically compare image data—field by field and/or frame to frame—associated with the image of the target site and, based on those comparisons, predict the direction (e.g., within the image) in which the object will move. Based on those predictions, correction moderation is accomplished in the direction of the object's motion to accommodate the differences in image data between the target image for which correction operations were established and the image data of the reflective object.

In addition to prediction based on the object's movement, predictive algorithms may also be implemented to predict changes in the image data being acquired relating to points on the surface of the object, i.e., changes in the correction moderation associated with the object itself. While two pixels may, at different times, have image data associated with a particular point of the object's surface (i.e., due to the motion of the object therebetween), those two pixels may have different values for that point's image data (e.g., like the flash of bright light arising from an optimally-aligning orientation of the mirror—some pixels receive the flash, while others don't). That is, the particular point of that object may have image data that increases or decreases, or otherwise changes, from pixel to pixel as the object moves and/or changes orientation.

In an example embodiment, predictive algorithms are implemented in the system which enable prediction of such changes in image data for the point. Based thereon, the system provides for changes in correction moderation from pixel to pixel for that point. Generally, these changes in correction moderation are different from the changes in correction operations associated with movement of the object into the pixel.

Through use of these and/or other predictive algorithms, correction operations adapt to perturbations implicating dynamic range, as caused by, e.g., movement and/or orientation changes of relatively reflective objects in and around the target site. In this way, as examples, scale factors can be applied to or in the transformative function(s) for a different set of pixels from field to field or frame to frame, or changing only once every selected plurality of fields/frames depending on a rate of change of position/orientation of the object.

A consideration in performing a correction operation is whether to correct the entire pixel value or only components thereof. For example, in an image signal in video format characterized by luminance and chrominance components, correction may be applied only to image data relating to a luminance component. However, in so doing, the chrominance component may be implicated undesirably (e.g., the color detail may tend to be reduced in the display image). Therefore, example embodiments may apply correction operations to the image data relating to a selected individual component alone, to plural components, or to all components.

In one of these example embodiments, different sets of correction coefficients are used for each respective, corrected component; e.g., one set for luminance and one set for chrominance. If the image signal is coded in RGB format, then sets of correction coefficients may be used for each respective, corrected component whether R, G and/or B.

In an example embodiment accordance with the present invention, plural correction operations are applied. Typically, each correction operation is applied respectively-to different (possibly overlapping) portions of the image data associated with an image. That is, correction operations may be applied to image signal(s) (e.g., directed to one or more signal components) as to a first set of selected pixels (i.e., however organized), while one or more other corrections operations may also be applied to such image signal(s) (e.g., directed to one or more other signal components) as to a second set of selected pixels (i.e., however organized), wherein the first and second sets may be partly or wholly different. In this way, the embodiment may be implemented, e.g., to correct in certain aspect(s) for selected portions of the image, such as to bring out selected detail in the display image enabling a user's enhanced perception thereof.

In another aspect of the present invention, correction is by selection from among a plurality of established correction options. The correction options may be variously implemented. Examples of the correction options include support for various correction operations, and/or for various transformative functions, and/or for various correction moderation operations, and/or for various correction factors (e.g., for various correction coefficients). The correction options may be developed, including, for example, empirically. The correction options may comprise closed form mathematical models of correction factors, or may alternatively be compilations of correction factors stored as a set, rather than computed from the mathematical models. In either of the above or other approaches, the correction options may comprise correction operations that are responsive to one or more of portions of the target site, to components of acquired image data, user input, system configuration, system operation and otherwise, but which are independent of performing a characterization operation and of establishing, based at least in part on the characterization operation, one or more correction factors. In such case, the system would typically have one or more of these correction options built in (e.g., with or without correction operations that employ a characterization operations and such establishing of factors), for employ upon mere selection.

In an example embodiment of the above, the use of correction options preferably enables a doctor, or any user of the endoscopic imaging system, to select a correction option. As an example, the user is enabled to cycle through correction options available on the endoscopic imaging system (e.g., by turning a rotary switch on the CCU). In another example, the user is enabled to select by entering respective identifiers associated with various components (e.g., relevant components by some code number or name or the other appropriate identifier) so that the system selects a correction option (i.e., found or calculable for that combination of components). In yet another example, the endoscopic imaging system automatically recognizes the various components assembled in the system and selects an appropriate correction option, preferably doing so without or with minimal user input. In this lattermost example, a "plug-and-play" result is achieved whereby a correction option is selected and applied to the image signals in an endoscopic imaging system.

In any case, the plurality of correction options generally are implemented preferably so as to include the information necessary to correct a non-uniformly illuminated target site, as well as to correct for aberrations, or anomalies, or artifacts, introduced by other components of the endoscopic imaging system. These aberrations, anomalies, or artifacts, may result from the use of particular components of the endoscopic imaging system, and/or from particular combinations of various components in assembling the endoscopic imaging system (e.g., by the makes/models/characteristics of the light source, fiber bundle, endoscope, imaging detector, monitor, and so on).

In a still further aspect of the present invention, the endoscopic imaging system is equipped with a network interface. Such interface typically is implemented as part of the CCU. Such interface enables communication between the system and one or more remote information sources. In a typical embodiment, the interface provides access to a local area network (wired or wireless LAN) which, in turn, provides access, through various well-known hub, bridge, router, and other network components, to other computers, including computers that are configured to serve information such as image signal correction coefficient sets associated with one or more components of the endoscopic imaging system. In this manner, image signal correction operations or options, or factors, or coefficients, or any other related part or aspect of the invention, for the endoscopic imaging system, or any components thereof (e.g., new or upgraded), may be downloaded to the system (e.g., to the CCU).

Various embodiments of the system also include an interface through which a user is enabled to enter data and control information, as well as to receive data and information about the system and/or various other parameters of the system's operation. The interface may include a display which provides graphical indications of the various parameters, or may provide that information in a text-based format, or a combination of graphics and text. The interface is configured to receive input from the user, and such input may be received by means of one or more buttons or switches, a touch-screen, a keyboard, a speech recognition module, or any other suitable means of entering data.

As is recognized by those of skill in the art having the benefit of this disclosure, correction operations (including, without limitation, transformative functions), correction moderation (including, without limitation, predictive algorithms) and other aspects of the invention may be variously implemented. As a general example, the invention may be implemented entirely in hardware (e.g., logic), or entirely by means of software (e.g., executed by a general purpose computer/processor), or entirely by means of a digital signal processor (DSP) (e.g., having embedded code), or by various combinations of the preceding, or otherwise.

Various illustrative embodiments herein focus on implementations of the present invention in the context of endoscopic imaging systems. Although endoscopic imaging systems and other medical instrumentation benefit from various aspects and/or embodiments of the present invention, it is noted that non-medical instrumentation and/or systems might also benefit from one or more of the aspects and/or embodiments of the present invention.

References herein to "one embodiment", "an embodiment", "example embodiment", or similar formulations, mean that a particular feature, process, action, operation, structure, and/or characteristic described in connection with the embodiment is included in at least one embodiment of the present invention. Thus, the appearances of such phrases or formulations herein are not necessarily all referring to the same embodiment. However, various or all particular features, structures, or characteristics may be combined in any suitable manner in one or more embodiments.

Persons skilled in the art will recognize the foregoing description and embodiments are not limitations, but examples. It is recognized by persons skilled in the art having the benefit of this disclosure that many modifications and variations are possible in the details, materials, and arrangements of the parts and actions which have been described and illustrated in order to explain the nature of this invention; and that such modifications and variations do not depart from the spirit and scope of the teachings and claims contained herein.

What is claimed is:

1. A method of compensating for non-uniformity in an image signal, the method comprising:

performing a characterization operation on an endoscopic optical image portion of an input image signal from an image sensor that comprises a pixel array of imaging elements, the endoscopic optical image portion of the image signal originating from an endoscopic optical image that is incident on at least a portion of the optical image sensor, which portion is subject to non-uniform illumination and non-uniform optical characteristics, the portion of the input signal originated by the endoscopic optical image requiring compensation to render it suitable for output as a video signal;

establishing, based at least in part on the characterization operation, one or more correction factors to compensate for the non-uniform illumination and non-uniform optical characteristics in the endoscopic optical image portion of the input image signal from the sensor;

acquiring selected endoscopic image data from the endoscopic optical image portion of the input image signal; and applying, using at least one of the established correction factors, a compensation operation on the endoscopic optical image portion of the input image signal to address the non-uniform illumination and non-uniform optical characteristics in the signal before conversion to an output video signal;

wherein the compensation operation is determined and provided using pixel-by-pixel correction factors to correct non-uniformities arising at individual pixel locations.

2. The method of claim 1, further comprising performing a characterization trigger operation to trigger performing the characterization operation.

3. The method of claim 2, wherein performing a characterization trigger operation comprises, is part of, or is in association with, a white balance process.

4. The method of claim 3, wherein performing a white balance process comprises acquiring image data associated with a white target.

5. The method of claim 1, further comprising providing a reference target and wherein performing a characterization operation comprises acquiring image data associated with the reference target.

6. The method of claim 5, wherein providing a reference target comprises providing a white target, such target being provided in connection with a white balance process.

7. The method of claim 5, further comprising using a filtering function to remove undesirable artifacts from the image data associated with the reference target.

8. The method of claim 7, wherein using a filtering function comprises using an adaptive filtering function responsive to artifacts that are dynamic.

9. The method of claim 1, wherein performing a characterization operation comprises acquiring image data consistent with establishing selected correction factors.

10. The method of claim 1, wherein performing a characterization operation comprises acquiring image data of a selected granularity.

11. The method of claim 1, wherein establishing correction factors is performed at a selected granularity.

12. The method of claim 1, wherein establishing correction factors comprises considering, at least in part, a correction operation in which one or more of the established correction factors is to be used.

13. The method of claim 12, wherein considering a correction operation in which one or more of the established correction factors is to be used comprises using a look up table having entries with values determined in accordance with a correction operation, and correction factors are established by correlating image data associated with a reference target to such entries the image data being from the endoscopic optical image portion of the image signal.

14. The method of claim 1, wherein establishing correction factors comprises generating one or more correction coefficients.

15. The method of claim 1, wherein establishing correction factors comprises using a reference value.

16. The method of claim 15, wherein using a reference value comprises using a peak value, or some value based thereon, the peak value being associated with acquired image data of one or both of a reference target and a target site.

17. The method of claim 15, wherein using a reference value comprises using a value based on selected image data, such image data being associated with acquired image data of one or both of a reference target and a target site.

18. The method of claim 15, wherein using a reference value comprises using computational analysis of image data, such image data being associated with acquired image data of one or both of a reference target and a target site.

19. The method of claim 18, wherein using computational analysis enables rejection of selected image data.

20. The method of claim 18, wherein using computational analysis enables branching determination as to correction operation.

21. The method of claim 18, wherein using computational analysis comprises using histogram analysis.

22. The method of claim 15, wherein using a reference value comprises using an average picture level.

23. The method of claim 1, wherein applying a correction operation as to selected image data comprises application at a selected granularity.

24. The method of claim 1, wherein applying a correction operation as to selected image data comprises applying one or more selected correction operations, such application of each selected correction operation being responsive to one or more of: portion(s) of the target site, component(s) of acquired image data, user input, system configuration, and system operation.

25. The method of claim 24, wherein applying one or more selected correction operations comprises using at least one correction operation that is independent of one or both of performing a characterization operation and establishing correction factors.

26. The method of claim 1, wherein applying a correction operation comprises using one or more transformative functions as to image data associated with the target site.

27. The method of claim 1, wherein applying a correction operation comprises using at least one correction operation that is independent of one or both of performing a characterization operation and establishing correction factors.

28. The method of claim 1, further comprising storing correction factors.

29. The method of claim 1, further comprising repeating one or both of performing a characterization operation and establishing correction factors.

30. The method of claim 29, wherein such repeating is triggered with performance of a white balance process.

31. The method of claim 1, further comprising performing a correction translation process.

32. The method of claim 1, further comprising performing defect correction associated with one or more defective imaging elements, which defect correction comprises: (a) interpolation of image data of selected imaging elements; (b) extrapolation of image data from selected imaging elements; (c) substitution of image data from a selected imaging element; or (d) a combination of two or more of (a)-(c).

33. The method of claim 1, further comprising performing correction moderation as to a dynamic range parameter associated with the endoscopic imaging system.

34. The method of claim 33, wherein performing correction moderation as to dynamic range comprises: tracking values of image data, as acquired or after application of a correction operation, and taking selected action if such values approach a threshold relative to the dynamic range.

35. The method of claim 34, wherein taking selected action comprises: (a) controlling acquisition of image data; (b) conditioning selected acquired image data prior to application of a correction operation; (c) conditioning selected image data after application of a correction operation; (d) applying an additional correction operation; (e) suspending application of a correction operation; (f) changing one or more correction factors; (g) switching to a different correction operation; (h) triggering a dynamically-changing scale-down factor applicable to, or in, a correction operation based on rate of change of the tracked values, or one or more selected components thereof, increases or decreases; or (i) a combination of two or more of (a)-(h).

36. The method of claim 35, wherein controlling acquisition of image data comprises reducing shutter speed of an imaging detector.

37. The method of claim 33, wherein performing correction moderation comprises using predictive algorithms in providing for changes in correction moderation responsive to changes in image data.

38. An endoscopic imaging system for acquiring an endoscopic optical image of a target and providing an input signal for conversion to an output video signal, the system comprising:
   an optical image sensor comprising a pixel array of imaging elements for acquiring the endoscopic optical image and converting it to an input image signal comprising a signal portion originating from the endoscopic optical image that is incident on at least a portion of the optical image sensor, which portion is subject to non-uniform illumination and non-uniform optical characteristics, the portion of the input signal originated by the endoscopic optical image requiring compensation to render it suitable for output as a video signal; and
   system components constructed and arranged to:
      perform a characterization operation on the endoscopic optical image portion of the input image signal from the image sensor;
      establish, based at least in part on the characterization operation, one or more correction factors to compensate for the non-uniform illumination and non-uniform optical characteristics in the endoscopic optical image portion of the input image signal from the sensor;
      acquire selected endoscopic image data from the endoscopic optical image portion of the input image signal; and
      apply, using at least one of the established correction factors, a compensation operation on the endoscopic optical image portion of the input image signal to address the non-uniform illumination and non-uniform optical characteristics in the signal before conversion to an output video signal;
      wherein the compensation operation is determined and provided using pixel-by-pixel correction factors to correct non-uniformities arising at individual pixel locations.

39. The endoscopic imaging system of claim 38, wherein the system components are constructed and arranged to perform a characterization trigger operation so as to trigger performing the characterization operation.

40. The endoscopic imaging system of claim 38, wherein the system components apply one or more selected correction operation, such application of each selected correction operation being responsive to one or more of: portion(s) of the target site, component(s) of acquired image data, user input, system configuration, and system operation.

41. The endoscopic imaging system of claim 38, wherein the system components perform defect correction associated with one or more defective imaging elements, which defect correction comprises: (a) interpolation of image data of selected imaging elements; (b) extrapolation of image data from selected imaging elements; (c) substitution of image data from a selected imaging element; or (d) a combination of two or more of (a)-(c).

42. The endoscopic system of claim 38 wherein the image sensor comprises a CCD or CMOS sensor, and a CCU receives the input signal and converts it to the output video signal.

43. An endoscope for acquiring an endoscopic optical image of a target and providing an input signal for conversion to an output video signal, the system comprising:
   an optical image sensor comprising a pixel array of imaging elements for acquiring the endoscopic optical image and converting it to an input image signal comprising a signal portion originating from the endoscopic optical image that is incident on at least a portion of the optical image sensor, which portion is subject to non-uniform illumination and non-uniform optical characteristics, the portion of the input signal originated by the endoscopic optical image requiring compensation to render it suitable for output as a video signal; and
   system components constructed and arranged to:
      perform a characterization operation on the endoscopic optical image portion of the input image signal from the image sensor;
      establish, based at least in part on the characterization operation, one or more correction factors to compensate for the non-uniform illumination and non-uniform optical characteristics in the endoscopic optical image portion of the input image signal from the sensor;
      acquire selected endoscopic image data from the endoscopic optical image portion of the input image signal; and
      apply, using at least one of the established correction factors, a compensation operation on the endoscopic optical image portion of the input image signal to address the non-uniform illumination and non-uniform optical characteristics in the signal before conversion to an output video signal;
      wherein the compensation operation is determined and provided using pixel-by-pixel correction factors to correct non-uniformities arising at individual pixel locations.

44. The endoscope of claim 43, wherein the elements are constructed and arranged to perform a characterization trigger operation so as to trigger performing the characterization operation.

45. The endoscope of claim 43, wherein the elements apply one or more selected correction operation, such application of each selected correction operation being responsive to one or more of: portion(s) of the target site, component(s) of acquired image data, user input, system configuration, and system operation.

46. The endoscope of claim 43, wherein the elements perform defect correction associated with one or more defective imaging elements, which defect correction comprises one or more of: (a) interpolation of image data of selected imaging elements; (b) extrapolation of image data from selected imaging elements; and (c) substitution of image data from a selected imaging element.

47. An imaging system for acquiring an optical image of a target and providing an input signal for conversion to an output video signal, the system comprising:

an optical image sensor comprising a pixel array of imaging elements for acquiring the optical image and converting it to an input image signal comprising a signal portion originating from the optical image that is incident on at least a portion of the optical image sensor, which portion is subject to non-uniform illumination and non-uniform optical characteristics, the portion of the input signal originated by the optical image requiring compensation to render it suitable for output as a video signal; and system components constructed and arranged to:

perform a characterization operation on the endoscopic optical image portion of the input image signal from the image sensor;

establish, based at least in part on the characterization operation, one or more correction factors to compensate for the non-uniform illumination and non-uniform optical characteristics in the endoscopic optical image portion of the input image signal from the sensor;

acquire selected endoscopic image data from the endoscopic optical image portion of the input image signal; and apply, using at least one of the established correction factors, a compensation operation on the endoscopic optical image portion of the input image signal to address the non-uniform illumination and non-uniform optical characteristics in the signal before conversion to an output video signal;

wherein the compensation operation is determined and provided using pixel-by-pixel correction factors to correct non-uniformities arising at individual pixel locations.

48. The imaging system of claim 47, wherein the means for performing a characterization operation further performs a characterization trigger operation to trigger performing the characterization operation.

49. The imaging system of claim 47, wherein the means for establishing one or more correction factors applies one or more selected correction operation, such application of each selected correction operation being responsive to one or more of: portion(s) of the target site, component(s) of acquired image data, user input, system configuration, and system operation.

* * * * *